United States Patent Office 3,186,834  
Patented June 1, 1965

3,186,834  
PREPARATION OF RARE EARTH METAL SPONGE  
Dale L. Schechter and William E. Domning, Midland, Mich., assignors to The Dow Chemical Company, Midland, Mich., a corporation of Delaware  
No Drawing. Filed Mar. 2, 1961, Ser. No. 92,759  
6 Claims. (Cl. 75—84.5)

The invention relates to the preparation of rare earth metal and more particularly relates to an improved method of preparing rare earth metal sponge from rare earth metal halide.

For the purposes of the specification and the appended claims the term rare earth metal includes scandium and yttrium in addition to the lanthanide series (elements having atomic numbers 57 through 71).

Heretofore, in the preparation of rare earth metal by reduction of a rare earth metal halide with a more active metal, difficulties have been encountered in separating the so-formed metal from a melt or a casting containing both reaction products and unreacted starting materials.

It is therefore a principal object of the invention to provide an improved method of preparing rare earth metal from rare earth metal chloride whereby the separation of the so-formed metal from the reaction mixture and subsequent purification is simplified and improved.

It has now been found that upon reacting rare earth metal chloride in coherent massive form with a suitable more active reductor metal, hereinafter more fully defined, at an elevated temperature and under an inert atmosphere, thereby forming a higher melting rare earth metal sponge and a lower melting reductor metal chloride, and thereafter separating the reductor metal chloride by filtering it or draining it, while it is in molten form, therefrom the reaction mixture, the production of high purity rare earth metal sponge is greatly facilitated.

Suitable reductor metals are those which are capable of reducing a rare earth metal chloride to rare earth metal and which, in addition, have a boiling temperature at ambient atmospheric pressure at least 100 centigrade degrees, and more preferably 200 centigrade degrees, below the boiling temperature of the rare metal whereby unreacted reductor metal employed in the present method can be volatilized and distilled from the rear earth metal product. A further requirement is that the reductor metal chloride formed in the reduction step have a melting temperature at last 30 centigrade degrees, and preferably more than 50 centigrade degrees, lower than the melting temperature of the rare earth metal sponge formed in the reduction process whereby the chloride can be separated from the sponge according to the present method.

For the purposes of the specification and claims the term reductor metal choride includes the pure chloride and mixtures thereof with alkali metal or alkaline earth metal chloride.

Suitable reductor metals include sodium, potassium, lithium, magnesium, calcium, barium, zinc, and cadmium. Of these sodium is preferred because of its volatility, low cost, and the ease of purifying it just before use.

Suitable rare earth metal chlorides which may be reduced according to the practice of the invention by any of the above listed reductor metals include the simple chlorides, i.e., binary compounds with chlorine, of neodymium, samarium, europium, gadolinium, scandium, terbium, yttrium, holmium, dysprosium, erbium, thulium, lutetium praseodymium and ytterbium.

Lanthanum chloride may be reduced according to the invention by any of the listed reductor metals except barium. Barium chloride melts well above the melting temperature of lanthanum. Similarly cerium chloride may be reduced according to the present method by any of the listed reductor metals except barium and sodium.

In reducing praseodymium chloride with barium, lanthanum chloride with sodium and cerium chloride with magnesium, according to the present method, precise temperature control must be maintained during the separation step since the reductor metal chlorides formed by these combinations melt only slightly lower than the rare earth metal formed.

In addition, cerium chloride may be reduced by potassium or calcium according to the present method providing a melting point depressant, such as one or more additional metal halides, is added to the reaction mixture to cause the potassium or calcium chloride formed in the reaction to melt at least 30 to 50 centigrade degrees lower than the melting point of pure potassium or calcium chloride. Melting point depressants such as alkali metal or alkaline-earth metal halides which are not reducible by the reductor metal may be used to advantage to lower the melting temperature of any of the reductor metal chlorides which melt at temperatures close to the melting point of the rare earth metal formed.

As an example of the use of a melting temperature depressant, 2.3 parts of sodium chloride per 100 parts of cerium chloride ($CeCl_3$) may be used in the reduction of cerium chloride with calcium to reduce the melting temperature of calcium chloride formed in the reduction to lower than 745° C.

A suitable type of reaction vessel is one equipped with means for filtering molten reductor metal chloride and unreacted reductor metal from the reaction mixture, preferably at the end of the reaction period. The reaction vessel is also provided with heating means, such as electrical resistance heaters, with connections to a vacuum pump and to a supply of dry inert gas, as well as connections to admit rare earth metal chloride and reductor metal.

A type of vessel equipped for simple gravity filtration is a cylindrical one formed of tantalum or other chemically resistant material and having press fitted therein and welded thereto a plate formed of tantalum, ceramic, or other inert material, which is mounted transversely across the vessel about midway the ends dividing the vessel into two chambers, an upper chamber and a lower one. The so-mounted plate is foraminous, being pierced at numerous places with drill holes each about 0.01 to 0.05 inch in diameter so that the plate serves as a coarse filter for gravity flow filtration, though a finer filter may be used, if desired. The reaction vessel is mounted and arranged so that it can be inverted to carry out the gravity flow filtration at the end of the reaction period.

In carrying out the method of the invention, in the apparatus described above, a charge of rare earth metal chloride in massive form, obtained as by fusing the salt or by subliming it onto a cold surface, is placed in the lower part of the reaction vessel. For convenience the salt may be obtained in massive form by subliming it, or distilling it, directly into the reaction vessel. The vessel is purged of air and filled with an inert gas such as helium or argon, the inert atmosphere in the reactor vessel being maintained thereafter during the process.

Then the requisite amount of reductor metal to provide about the stoichiometric amount, but more preferably about 20 percent more than the stoichiometric amount, is added to the charge of rare earth metal chloride. Generally, it is convenient to sublime or distill the more volatile reductor metals into the reaction zone in the vessel.

The reaction mixture is then heated to a temperature somewhat above that at which the reactants and the reductor metal chloride remain molten, but preferably at least 30 centigrade degrees, and more preferably at least 50 centigrade degrees below the melting temperature of the rare earth metal. Generally a reaction temperature in the range of 800 to 1100° C. suffices for most rare earth metals. A reaction period of about one hour at temperature is adequate for reaction mixtures weighing 500 to 800 grams. With larger quantities of reactants reaction times tend to be a little longer.

At the end of the reaction period the reductor metal chloride formed in the reduction process is drained away from the rare earth metal sponge obtained, conveniently while the reaction mixture is still hot enough that the reductor metal salt is molten. To accomplish the desired separation the reaction mixture is therefore filtered, as in the reaction vessel described hereinabove which is provided with a pierced plate which serves as a filter. The reaction vessel is inverted, the molten salt flowing through the filter and the rare earth metal sponge being retained. Heating is provided as needed, though if the filtration is carried out promptly at the end of the reaction period the molten salt is separated within a few minutes.

Finally the rare earth metal sponge is purified by heating it while it is under a reduced pressure of less than about 0.1 mm. of mercury absolute but desirably at a pressure of about 0.001 mm. of mercury absolute. Under such a reduced pressure and at temperatures of about 750 to 1000° C. but preferably at least 50 to 100 centigrade degrees below the melting temperature of the rare earth metal, residual reductor metal chloride as well as unreacted rare earth metal chloride and reductor metal are sublimed or distilled away into a suitable trap. Purification for most purposes is adequate in 2 to 8 hours though the step may be prolonged if desired.

It is also possible to carry out the invention in yet another way.

A reaction vessel having a coarse grid therein need not be inverted if the rare earth metal chloride is sublimed, or otherwise placed in the vessel, above the grid so that the chloride is deposited in sealing relationship with the vessel walls. The reductor metal is placed atop the rare earth metal chloride and the reaction therebetween initiated by heating the reactants under an inert atmosphere. Reaction with the rare earth metal chloride takes place from the top down. When the reaction is substantially completed and the reaction front reaches the coarse filter or grid, a rare earth metal sponge has formed and the reductor metal chloride produced in the reaction is still molten. Under these conditions, the still molten salt runs through the grid, but the metal sponge is retained.

The present process may also be carried out in yet another manner, if desired, in a reaction vessel which is equipped to filter the reaction mixture in other ways, e.g., by vacuum or pressure filtration. In this type of vessel the reactants are usually positioned and reacted above the filter and the vessel need not be inverted to carry out filtration. For this manner of operation there is required a relatively fine filter having openings smaller than about 5 microns diameter to prevent untimely passage of molten material and filtration does not occur until a substantial pressure drop is applied across the filter (e.g., 10–15 p.s.i.).

*Example*

The following example serves to illustrate the advantages of practicing the present invention and the invention is not to be considered limited thereto.

A solid chunk of sublimed yttrium chloride weighing 475 grams and 200 grams of redistilled sodium were placed in a cylindrical reaction vessel which had been purged of air and provided with an atmosphere of helium which was maintained during the subsequent reaction period. Inside the reaction vessel, which was formed of tantalum about midway the ends, a tantalum plate was fitted transversely across the vessel dividing it into two chambers. The tantalum plate was pierced, having many No. 70 drill holes (about 0.02 inch diameter) therethrough. Externally the reaction vessel was provided with resistance heaters. The entire assembly was constructed so that it could be inverted.

The contents of the reaction vessel were heated to 1000° C. in one hour and maintained at that temperature for one hour. The reaction vessel was then immediately inverted, permitting molten sodium chloride formed in the reaction to drain through the tantalum disc. Yttrium formed in the reaction remained above the disc in the form of a coherent sponge. The yttrium sponge was further purified by connecting the reaction vessel to a high vacuum pump and heating the yttrium sponge to a temperature of 1000° C. for about 8 hours under a reduced pressure of 0.001 mm. of mercury, thereby distilling off unreacted starting materials. The so-purified sponge was analyzed chemically and was found to be 96.9 percent Y.

The process of the invention being thus described obvious modifications thereof will be apparent to those skilled in the art and the scope of the invention is to be considered limited only by the hereafter appended claims.

We claim:

1. The improved method of preparing yttrium which comprises heating a reductor metal selected from the group consisting of sodium, potassium, lithium, magnesium, calcium, barium, zinc and cadmium, together with a coherent mass of yttrium chloride under an inert atmosphere and at a temperature sufficient to initiate reaction between the reductor metal and yttrium chloride, but the reaction temperature being maintained at least 30 centigrade degrees below the melting temperature of yttrium thereby to cause reduction of the yttrium chloride to a metal sponge and oxidation of the reductor metal chloride; and separating said reductor metal chloride in molten form from a mixture thereof with said metal sponge.

2. The improved method of preparing yttrium which comprises heating sodium together with a coherent mass of yttrium chloride under an inert atmosphere and at a temperature of at least 800° C., but the temperature being at least 30 centigrade degrees lower than the melting temperature of yttrium thereby to cause reduction of the yttrium chloride to yttrium sponge and oxidation of the sodium to sodium chloride; filtering said sodium chloride in molten form from an admixture thereof with said yttrium sponge; and subjecting said yttrium sponge to a temperature of 750 to 1000° C. and a reduced pressure below about 0.1 mm. of mercury for at least 2 hours thereby to distil from the sponge unreacted sodium and yttrium chloride.

3. In a method of preparing rare earth metal which comprises heating a reductor metal selected from the group consisting of sodium, potassium, lithium, magnesium, calcium, barium, zinc and cadmium, together with a coherent mass of rare earth metal chloride under an inert atmosphere and at a temperature sufficient to initiate reaction between the reductor metal and the rare earth metal chloride, but the reaction temperature being maintained at least 30 centigrade degrees below the melting temperature of the rare earth metal which corresponds to the rare earth metal chloride thereby to cause reduction of the rare earth metal chloride to a metal sponge and oxidation of the reductor metal to the reductor metal chloride, the improved method of separating the reductor metal chloride from the metal sponge which comprises: adding to the reductor metal chloride a melting point depressant selected from the group consisting of alkali metal halides and alkaline earth metal halides which are not reducible by said reductor metal and which are additional to the reductor metal chloride, in an amount effective to reduce the melting temperature of said reductor metal chloride to a temperature at least 30 centigrade degrees lower than the melting temperature of said metal sponge; and separating the reductor metal chloride in molten form from a mixture thereof with said metal sponge.

4. The improved method of preparing rare earth metal which comprises:

heating a reductor metal selected from the group consisting of sodium, potassium, lithium, magnesium, calcium, barium, zinc and cadmium together with a coherent mass of rare earth metal chloride under an inert atmosphere and at a temperature sufficient to initiate reaction between the reductor metal and rare earth metal chloride, but the temperature being at least 50 centigrade degrees lower than the melting temperature of the rare earth metal which corresponds to the said rare earth metal chloride, thereby to form a metal sponge upon reduction of the rare earth metal chloride and oxidation of the reductor metal to the reductor metal chloride;

separating said reductor metal chloride in molten form from a mixture thereof with said metal sponge;

said reductor metal being selected from (1) capable of reducing said rare earth metal chloride, (2) having a boiling temperature at ambient atmospheric pressure at least 100 centigrade degrees below the boiling temperature of said rare earth metal and (3) having, in chloride salt form, a melting temperature at least 50 centigrade degrees below the melting temperature of the said metal sponge.

5. The improved method of preparing rare earth metal which comprises:

heating a reductor metal selected from the group consisting of sodium, potassium, lithium, magnesium, calcium, barium, zinc and cadmium together with a coherent mass of rare earth metal chloride under an inert atmosphere and at a temperature of at least 800° C., but the reaction temperature being at least 30 centigrade degrees lower than the melting temperature of the rare earth metal which corresponds to the said rare earth metal chloride, thereby to form a metal sponge upon reduction of the rare earth metal chloride and oxidation of the reductor metal to the reductor metal chloride;

separating said reductor metal chloride in molten form from a mixture thereof with said metal sponge;

said reductor metal being selected from metals (1) capable of reducing said rare earth metal chloride (2) having a boiling temperature at ambient atmospheric pressure at least 100 centigrade degrees below the boiling temperature of said rare earth metal and (3) having, in chloride salt form, a melting temperature at least 30 centigrade degrees below the melting temperture of the said metal sponge and thereafter subjecting said metal sponge to a temperature of about 750 to 1000° C. but at least 50 centigrade degrees below its melting temperature, and a reduced pressure below about 0.1 mm. of mercury for at least 2 hours thereby to distill off unreacted starting materials and residual reduction metal chloride.

6. In the method of preparing rare earth metal by the direct reduction of rare earth metal chloride with a reductor metal selected from the group consisting of sodium, potassium, lithium, magnesium, calcium, barium, zinc and cadmium, the improvement which comprises:

arraying the rare earth metal chloride and the reductor metal within an enclosed reaction zone as respective contiguous homogeneous masses;

without admixing the masses, heating the masses to initiate reaction therebetween, whereby the reaction proceeds through the mass of rare earth metal chloride along a front, and the temperature being maintained at least 30 centigrade degrees below the melting temperature of the rare earth metal formed in the reduction, whereby the rare earth metal is produced in the reaction in the form of a metal sponge;

filtering the reductor metal chloride formed in the reaction from the metal sponge at a temperature at which the reductor metal chloride is molten, but at least 30 centigrade degrees below the melting temperature of the rare earth metal.

References Cited by the Examiner
UNITED STATES PATENTS

| | | | |
|---|---|---|---|
| 2,773,760 | 12/56 | Winter | 75—84.5 |
| 2,828,199 | 3/58 | Findlay | 75—84.5 X |
| 2,950,962 | 8/60 | Carlson et al. | 75—84.4 |

FOREIGN PATENTS

| | | |
|---|---|---|
| 430,116 | 8/11 | France. |
| 489,155 | 8/18 | France. |
| 628,147 | 8/49 | Great Britain. |
| 791,121 | 2/58 | Great Britain. |

DAVID L. RECK, *Primary Examiner.*

WINSTON A. DOUGLAS, *Examiner.*

UNITED STATES PATENT OFFICE
CERTIFICATE OF CORRECTION

Patent No. 3,186,834

June 1, 1965

Dale L. Schechter et al.

It is hereby certified that error appears in the above numbered patent requiring correction and that the said Letters Patent should read as corrected below.

Column 4, line 35, after "metal", first occurrence, insert -- to the reductor metal --; column 6, line 10, for "reduction" read -- reductor --.

Signed and sealed this 21st day of December 1965.

(SEAL)
Attest:

ERNEST W. SWIDER
Attesting Officer

EDWARD J. BRENNER
Commissioner of Patents